(12) United States Patent
Lemez et al.

(10) Patent No.: US 10,205,318 B2
(45) Date of Patent: Feb. 12, 2019

(54) METHOD AND SYSTEM FOR REDUCING LOSSES DURING ELECTRICAL POWER DISTRIBUTION

(71) Applicant: Energo Group Canada Inc., Calgary (CA)

(72) Inventors: Dragan Lemez, Calgary (CA); Aleksander Lemez, Istocno Sarajevo (BA)

(73) Assignee: ENERGO GROUP CANADA INC., Calgary (CA)

( * ) Notice: Subject to any disclaimer, the term of this patent is extended or adjusted under 35 U.S.C. 154(b) by 0 days.

(21) Appl. No.: 15/559,344

(22) PCT Filed: Dec. 30, 2016

(86) PCT No.: PCT/CA2016/051553
§ 371 (c)(1),
(2) Date: Sep. 18, 2017

(87) PCT Pub. No.: WO2017/117664
PCT Pub. Date: Jul. 13, 2017

(65) Prior Publication Data
US 2018/0115159 A1 Apr. 26, 2018

Related U.S. Application Data

(60) Provisional application No. 62/274,948, filed on Jan. 5, 2016.

(51) Int. Cl.
*H02J 3/26* (2006.01)
*H02J 3/00* (2006.01)
*H02J 3/38* (2006.01)

(52) U.S. Cl.
CPC ............... *H02J 3/005* (2013.01); *H02J 3/00* (2013.01); *H02J 3/38* (2013.01); *H02J 3/26* (2013.01); *Y02E 40/50* (2013.01)

(58) Field of Classification Search
CPC ........ H02M 1/02; H02M 1/042; H02M 1/088; H02M 1/10; H02J 3/005; H02J 3/26; H02J 3/38
See application file for complete search history.

(56) References Cited

U.S. PATENT DOCUMENTS 5,396,165 A 3/1995 Hwang et al.
5,604,385 A * 2/1997 David ................... H02J 3/14
307/52

(Continued)

FOREIGN PATENT DOCUMENTS

WO 99/49481 A1 9/1999

OTHER PUBLICATIONS

International Search Report, dated Apr. 5, 2017, for PCT/CA2016/051553, 3 pages.

(Continued)

*Primary Examiner* — Matthew V Nguyen
(74) *Attorney, Agent, or Firm* — Seed IP Law Group LLP

(57) ABSTRACT

Systems and methods which employ a distribution circuit adaptor (DCA) inserted into a branch supply circuit at a (site specific) suitable location between a trunk and the loads that each existing branch feeds. The systems and methods may identify the optimal location at which to insert one or more DCAs. In some implementations, the all-earthen grounding between the source and the step down transformers feeding a load site can be replaced. Such may be achieved by using pairs of existing trunk conductors to complete the return circuit on the primary side of the DCA, and optionally an additional dedicated return conduit to complete the return circuit on the secondary side of the DCA.

18 Claims, 4 Drawing Sheets

(56) References Cited

U.S. PATENT DOCUMENTS

| | | | |
|---|---|---|---|
| 7,242,110 B2 * | 7/2007 | Matsumoto | H02J 3/26 |
| | | | 307/14 |
| 8,188,823 B2 | 5/2012 | Le et al. | |
| 2011/0156851 A1 | 6/2011 | Honna | |
| 2011/0248808 A1 | 10/2011 | Singh et al. | |
| 2014/0146427 A1 * | 5/2014 | Huang | H02H 1/0061 |
| | | | 361/83 |
| 2015/0091545 A1 * | 4/2015 | Kussyk | G01R 29/18 |
| | | | 324/66 |

OTHER PUBLICATIONS

Written Opinion of the International Searching Authority, dated Apr. 5, 2017, for PCT/CA2016/051553, 5 pages.
International Search Report and Written Opinion, dated Dec. 5, 2017, for International Application No. PCT/CA2017/051077, 8 pages.

* cited by examiner

METHOD AND SYSTEM FOR REDUCING LOSSES DURING ELECTRICAL POWER DISTRIBUTION

BACKGROUND

Technical Field

This disclosure generally relates to the reconfiguration of select elements of a power distribution network to reduce losses inherent in traditional use of local soil or "earth" as the "ground" or neutral wire as a return path to close a supply circuit, while also reducing voltage instability.

Description of the Related Art

It is well known that three (3) phase systems may or may not have a neutral wire. A neutral wire allows the three (3) phase system to use a higher voltage, while still supporting lower voltage single phase equipment. In high voltage distribution, it is common not to have a neutral wire since the loads can simply be connected between phases of the source. However, 3 phase systems may use a fourth (neutral) wire, particularly in medium and low-voltage distributions where typically single phase step down transformers (SDTs) are installed. The neutral wire allows three separate single-phase supplies to be provided at a constant voltage, and is commonly used for supplying groups of domestic properties which are each single-phase loads. The connections are arranged so that, as far as possible in each group, equal power is drawn from each phase. Further up the distribution system, the currents are calculated to be balanced in each phase but in reality they are usually not well balanced. Transformers may be wired in a way that they have a four-wire secondary but a three-wire primary, allowing unbalanced loads and the associated secondary-side neutral currents. According to modern electrical code, each supply circuit has a ground wire that returns to the distribution panel and that is connected to a 10 foot long metal grounding rod driven into or buried in the local soil, outside but within approximately 10 feet of the footings of a structure. The distribution panel is typically connected to an overhead or underground supply circuit comprised of 2 or 3 conductors, limited to 100 or 200 Amp capacity. In some cases, the "neutral" or "return" conductor is grounded, but in other cases it is floating, with a separate ground conductor supplied for safety, permitting ground fault interruption devices or components to be included in certain circuits. These safety circuits should be separate from the supply.

Conventional (North American) electrical power distribution systems include a medium voltage three (3) phase trunk line crossing through a prospective service area. Over time, an increasing number of branch lines tap into that trunk line and are directed toward developing (e.g., industrial, commercial and residential) communities. These developing communities typically develop somewhat randomly, sprouting "leaves" comprised of step down transformers (SDT) and an ever increasing number of low voltage loads drawing greater amounts of energy. The electronic portion of these loads tends to be less tolerant of voltage instability. The resulting "tree like" assembly of circuits is commonly referred to as an electrical network or power grid.

Conventional electrical power generation equipment delivers a sinusoidal signal to the three (3) conductors comprising the above trunk line. The amplitude of that signal is typically higher at the source and along the trunk (sometimes known as—line voltage), then stepped down to lower medium voltage (sometimes known as—phase voltage) on the branch lines, then stepped down again to low voltage for consumption at the load sites. For a given power flow, as voltage decreases current increases, such that "heating" losses increase as higher currents must flow through more resistive media closer to the loads. At the same time, consumers of electrical energy switch their loading devices ON and OFF, respectively, drawing more and then less energy collectively. This causes dips and then surges of available energy on the distribution network. Many of the loads and modern service panels implement a "floating ground" at the load site, where dedicated neutral or return conductors are hard wired to close each circuit internally and the "ground" conductor is relied on for safety purposes to divert stray (including ground fault) currents away from users. In the many load sites, the step down/low (e.g., 120/240) voltage supply transformers are also installed with a dedicated ground conductor, between the service panel and the secondary of the SDT supplying that panel, as well as a hard wired neutral or return conductor back to the applicable SDT.

However, as energy consumption and delivery costs increase, there are still a number of load sites relying on an earthen form of ground (e.g., a metal stake driven into or buried in the local native soil in proximity to each of the SDT and its service panel) between the service panel and the secondary of the SDT supplying that panel. Moreover, some of those sites also use a grounded neutral to effectively close the return circuit through the service panel to the SDT for that site.

Further, even in connection to modern load sites having dedicated conduits for their grounding and (electrically isolated) return circuits, there exists the larger legacy problem of using an earthen ground on both the branch and trunk portions of that distribution network, to close those return circuits.

BRIEF SUMMARY

Traditionally, an SDT (secondary) used to supply single phase loads draws power from only one (1) of the phases of its three (3) phase (primary) source and the return path closing the circuit between such SDT and its (distant) source is the earthen ground. This approach effectively ignores the true resistance of that ground.

Disadvantageously, ignoring the effects of relatively high resistivity in earthen return circuits of a power distribution network, whether in the low, medium, or high voltage circuits results in wasteful losses and electrical imbalance that combine to reduce both the deliverable portion of generated energy and the life cycle of many of the components of those distribution networks.

Each traditional load (typically itself a group of smaller loads) is connected to its branch through a traditional step down transformer (SDT), the circuit for which may be closed through either an earthen ground or a dedicated "grounding" return conduit which may be cost effective where the distances permit such. The decision respecting how to close the return path for each individual load site (e.g., a farm) should be based on the distance between the SDT and the distribution panel that it supplies, combined with impedance of the soil type comprising the earthen ground path between them. Regardless of the means chosen on a given site to close the return path between the secondary side of an SDT and its load, the typically much greater distance between the primary side of that SDT and the three (3) phase source supplying it demands a superior means of closing that lengthy return circuit.

Harmonics are traditionally significant because at the "output" terminal (i.e., secondary coil) of each load site's SDT, the supply conductor is some type of metal of low resistivity (a.k.a. high conductivity) along which the energy flows smoothly to the load, then through the load, then through the much higher resistivity return path of earthen ground to "close" that circuit at the SDTs' ground terminal. During the process of passing through that circuit loop there arises an imbalance in the rate of energy flow as between the two "sides" of the circuit, which creates a form of electrical back pressure, much like the troughs and surges that switching loads ON/OFF creates, interfering with the symmetry of the sinusoidal signal from the source. This wave field back pressure manifests itself in harmonics of the primary wave, which reflected harmonic waves aggravate the transient troughs and surges impacting the amplitude of the primary wave. The resulting interference causes the two (2) halves of the sinusoidal signal to be differently shaped or unsymmetrical. In the event of resonance arising so that the interference is either constructive or destructive, a more extreme result may arise.

The typical approach in the power distribution industry in addressing problems related to delivering more and cleaner electrical power has concentrated on providing greater infrastructure capacity (e.g., taller towers, thicker conductors, higher voltages) and filtration at the point of consumption, where more efficient loads also help delay network expansion. Alternatively, there is a growing emphasis on supervisory control and data acquisition (SCADA) systems to control (low) voltage regulators to efficiently operate loads in the face of the harmful effects of asymmetry. Such an approach fails to either address the foundational issues, or extend the life cycle of existing infrastructure.

Described herein are methods and structures that advantageously employ existing electrical power distribution equipment in a previously ignored manner.

In order to overcome the disadvantages of previous approaches, the approach described herein employs a better adaptation of existing three (3) phase sources to supply existing single phase loads. The approach described herein can advantageously employ a Distribution Circuit Adaptor (DCA) inserted into a branch supply circuit at a (site specific) suitable location between the trunk and the loads that each existing branch feeds. Described herein is an approach to identify a location (e.g., optimal location) at which to insert one or more DCAs. Where it is economically feasible to do so, the all-earthen grounding or neutral conductor between the Source and the Step Down Transformers feeding the load site can be replaced or abandoned. This is accomplished by using pairs of existing trunk conductors to complete the return circuit on the primary side of the DCA, and an additional dedicated return conduit to complete the return circuit on the secondary side of the DCA. While there are other implementations of DCAs, a DCA may comprise a two (2) phase transformer having four (4) terminals that may be configured in two (2) ways.

Advantageously, the system described herein reduces the overall resistance of the circuit between the source and the primary side of each SDT that is connected to each branch that is connected to the secondary side of each DCA. This is accomplished by configuring the DCA to make more efficient use of existing trunk line infrastructure, which results in a lower current drawn from a medium voltage trunk line pair to supply the same quantum of current to existing branch lines. These effects of DCA primary reconfiguration are enhanced whenever it is economically feasible to add a dedicated return conduit to the secondary side of the DCA and further reduce resistivity on the medium voltage return circuit.

The advantageous manner of operation of the return path is in summary that 2-phase transformer apparatus DCA receives its input energy from two (instead of one) of the three phases of a 3-phase source (i.e., one 2-phase pair of the conductors of which are only 120 degrees out of phase) and adapts it to a 1-phase output, supplying the same quantum of power, but using lower input current flow. Traditional 3-phase sources supplying 1-phase SDTs that each tap only one of the available 3-phase source conductors and ground (or tap a neutral conduit if such exists) the other primary lead of the SDT so as to commonly use an earthen ground or neutral for the return path to close that circuit. In one or more implementations of the present disclosure, the DCA (e.g., DCA 110) provides an ungrounded pair of secondary output terminals (e.g., 211 and 112) as the (relatively) high voltage input to the primary coil of the 1-phase SDT the secondary of which supplies the low (120/240 Vac) voltage loads (e.g., 192*a*) of branch (e.g., branch 140) in which apparatus DCA is installed.

Whereas the DCA's primary connection is a "Delta" (across 1 of the 3 available 2-phase pairs from a 3-phase source) connection to a 3-phase supply, according to the present disclosure, the DCA's secondary operational connection is "Ye" (i.e. "star"/"floating neutral") to supply the primary of a single phase (SDT) load, which permits alternating source energy to flow more smoothly (due to relatively lower resistivity in the "return" circuit) between the network's distant originating substation—along a single conductor pair, then through the DCA acting as a 2-phase adaptor, then along the second conductor pair of that branch circuit, to the input terminals of the subject SDT stepping down network power from medium (line) voltage to low (phase) voltage for delivery to local loads. Advantageously, by implementing the DCA and its connection method, required energy is delivered much faster thereby improving intermittence or latency in delivering the energy to the end users. The distance from the SDT (e.g., SDT 182*a*) to loading panels (e.g., at 192*a*) is relatively short, such that the instability introduced by the higher resistivity, typically earthen grounding, return path has a smaller impact. Importantly, it is for safety code reasons only that the neutral/return of DCA would be connected to an earthen "ground" at all. Operationally, it is desirable to implement a floating neutral on the entire medium voltage circuit, from the substation through the adaptor (i.e., 2-phase transformer DCA), along the branch lines to the SDT at the load site, and then (at the secondary of the SDT) ground the return of the load panels only.

According to one or more implementations of the present disclosure, no significant human safety issue arises from leaving a pole mounted DCA completely isolated from ground. The pole is wood and the DCA's housing is resin. To address the transient condition of a lightning strike, each DCA site can be protected by a separate grounding system (e.g., surge arrestors) that shields the power distribution circuit.

Once the supply circuit's resistivity is better balanced and its current draw reduced, the advantages tend to cascade through the reduction of heating losses and harmful harmonics, that in turn permit the network operator to deliver a larger portion of its generated three (3) phase electrical power from its source to its paying customers, using existing infrastructure that is now operating more gently within its design capacity and so will also enjoy an extended life-cycle (e.g. wear and tear on equipment drops).

Advantageously, by eliminating the earthen grounding between the network's source (often a distant substation)

and the DCA, the much lower resistance of the medium voltage metallic conductors also results in a smaller drop in voltage along each lengthy circuit distributing the generated level of source voltage from the trunk lines to each branch of the network, such that the trunk voltage reaching the primary of the DCA will also be higher. Consequently, the secondary (medium-phase voltage) voltage available from the secondary coil of the DCA (i.e., Input Voltage/1.73) out to the SDT is also higher, making it "appear" to the SDT that the substation is "closer". Similarly, if the return circuit connection from the secondary of the DCA to the primary of the loaded SDT is upgraded and made directly, rather than an earthen connection used in rural areas, by dedicated conduit, then its branch circuit enjoys reduced losses. Advantageously, the effect of reduced resistivity losses and lower current draw in each branch as well as the trunk lines is cumulative for the network resulting in a number of related benefits including: less energy wasted into "line losses" or conductor heating, smaller drops in transmitted voltage along those same conductors, more balanced energy flow between the circuit paths each cycle, fewer material harmonics, and harmonics of smaller amplitude.

The approach described herein is further enhanced when the above DCA is replaced by a medium voltage regulating and optimization terminal (MVROT), which further reduces current and otherwise makes the network more efficient, enabling operators to deliver more of their source energy using existing infrastructure.

A method to reduce energy losses during electrical power distribution across a three phase network which may include a plurality of source terminals electrically coupled to a corresponding plurality of trunk lines, a number of branch lines, and for each of the branch lines, a step down transformer coupled to at least one single phase load that draws electrical power via the respective branch line, may be summarized as including for at least one pair of the plurality of trunk lines, providing a respective distribution circuit adapter (DCA), the DCA comprising a primary coil comprising a first input terminal and a second input terminal and a secondary coil comprising a first output terminal and a second output terminal; for each provided DCA, positioning the DCA at a physical location which is relatively closer to at least one of the number of branch lines than to the plurality of source terminals; for each pair of the at least one pair of trunk lines for which a respective DCA is provided, electrically coupling a first one of trunk lines to the first input terminal and a second one of the trunk lines to the second input terminal of the respective DCA; and for each provided DCA, electrically coupling at least one branch line to the first output terminal of the DCA.

The method may further include for each provided DCA, coupling an electrical conduit between the second output terminal of the DCA and a return path of an input of at least one step down transformer of at least one branch line coupled to the output of the DCA. Providing a respective DCA for at least one pair of the plurality of trunk lines may include providing a respective DCA for at least two pairs of the plurality of trunk lines. Providing a respective DCA for at least one pair of the plurality of trunk lines may include providing a respective DCA for at least a first pair of trunk lines and a second pair of trunk lines, the first pair of trunk lines sharing a common trunk line with the second pair of trunk lines.

The method may further include for each provided DCA, coupling an electrical conduit between the second output terminal of the DCA and a return path of an input of at least one step down transformer of at least one branch line coupled to the output of the DCA. Providing a respective DCA for at least one pair of the plurality of trunk lines may include providing a respective DCA for at least three pairs of trunk lines, each pair of trunk lines sharing a common trunk line with at least one other pair of trunk lines.

The method may further include for each provided DCA, coupling an electrical conduit between the second output terminal of the DCA and a return path of an input of at least one step down transformer of at least one branch line coupled to the output of the DCA. Positioning the DCA at a physical location which may be relatively closer to at least one of the number of branch lines than to the plurality of source terminals may include positioning the DCA at a physical location which is a first distance from the plurality of source terminals and a second distance from the at least one of the number of branch lines, the first distance at least twice the second distance.

A method to reduce energy losses during electrical power distribution across a three (3) phase network which may include a plurality of source terminals electrically coupled to a corresponding plurality of trunk lines, a number of branch lines, and for each of the branch lines, a step down transformer coupled to at least one single phase load that draws electrical power via the respective branch line, may be summarized as including for at least one pair of the plurality of trunk lines, providing a respective transformer; for each provided transformer, positioning the transformer at a physical location which is relatively closer to at least one of the number of branch lines than to the plurality of source terminals; for each pair of the at least one pair of trunk lines for which a respective transformer is provided, electrically coupling the trunk lines of the pair of trunk lines to a primary side of the respective transformer; and for each provided transformer, electrically coupling at least one branch line to an output of the transformer.

The method may further include for each provided transformer, coupling an electrical conduit between a return path of the output of the transformer and a return path of an input of at least one step down transformer of at least one branch line coupled to the output of the transformer. Providing a respective transformer for at least one pair of the plurality of trunk lines may include providing a respective transformer for at least two pairs of the plurality of trunk lines. Providing a respective transformer for at least one pair of the plurality of trunk lines may include providing a respective transformer for at least a first pair of trunk lines and a second pair of trunk lines, the first pair of trunk lines sharing a common trunk line with the second pair of trunk lines.

The method may further include for each provided transformer, coupling an electrical conduit between a return path of the output of the transformer and a return path of an input of at least one step down transformer of at least one branch line coupled to the output of the transformer. Providing a respective transformer for at least one pair of the plurality of trunk lines may include providing a respective transformer for at least three pairs of trunk lines, each pair of trunk lines sharing a common trunk line with at least one other pair of trunk lines. The method may further include for each provided transformer, coupling an electrical conduit between a return path of the output of the transformer and a return path of an input of at least one step down transformer of at least one branch line coupled to the output of the transformer. Positioning the transformer at a physical location which may be relatively closer to at least one of the number of branch lines than to the plurality of source terminals may include positioning the transformer at a physical location which is a first distance from the plurality of source terminals and a second distance from the at least one of the number of branch lines, the first distance at least twice the second distance.

A method for delivering three phase electrical power from a source through a distribution network may include a number of trunk lines electrically coupled to the source, a number of branch lines and at least one single phase load, and may be summarized as including tapping at least one pair of medium voltage trunk lines; electrically coupling a primary coil of a distribution circuit adaptor (DCA) across the tapped pair of trunk lines; electrically coupling a secondary coil of the DCA to at least one medium voltage branch line; providing a reduced resistivity return path between the secondary coil of the DCA and at least one load connected to the at least one medium voltage branch line; and operating the distribution network using the tapped pair of medium voltage trunk lines to close the return path between the primary coil of the DCA and the source feeding the trunk lines.

The method may further include electrically coupling the secondary coil of the DCA to at least one return path of a step down transformer associated with at least one of the number of branch lines.

A distribution circuit adaptor (DCA) for delivering three phase electrical power from a source across a distribution network may include three trunk lines supplying at least one branch line, and at least one step down transformer supplying at least one single phase voltage load, may be summarized as including a primary coil comprising a first input terminal and a second input terminal, the first input terminal electrically coupled to a first one of the trunk lines and the second input terminal electrically coupled to a second one of the trunk lines; and a secondary coil comprising a first output terminal and a second output terminal, the first output terminal coupled to at least one branch line. The second output terminal may be electrically coupled to at least one return path of a step down transformer associated with at least one branch line. The DCA may be positioned at a physical location which is relatively closer to the at least one step down transformer than to the source.

BRIEF DESCRIPTION OF THE SEVERAL VIEWS OF THE DRAWINGS

In the drawings, identical reference numbers identify similar elements or acts. The sizes and relative positions of elements in the drawings are not necessarily drawn to scale. For example, the shapes of various elements and angles are not necessarily drawn to scale, and some of these elements are arbitrarily enlarged and positioned to improve drawing legibility. Further, the particular shapes of the elements as drawn, are not necessarily intended to convey any information regarding the actual shape of the particular elements, and have been solely selected for ease of recognition in the drawings.

DETAILED DESCRIPTION

In the following description, certain specific details are set forth in order to provide a thorough understanding of various disclosed embodiments. However, one skilled in the relevant art will recognize that embodiments may be practiced without one or more of these specific details, or with other methods, components, materials, etc. In other instances, well-known structures associated with electrical distribution systems and networks have not been shown or described in detail to avoid unnecessarily obscuring descriptions of the embodiments.

Unless the context requires otherwise, throughout the specification and claims which follow, the word "comprise" and variations thereof, such as, "comprises" and "comprising" are to be construed in an open, inclusive sense.

Reference throughout this specification to "one embodiment" or "an embodiment" means that a particular feature, structure or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

As used in this specification and the appended claims, the singular forms "a," "an," and "the" include plural referents unless the content clearly dictates otherwise. It should also be noted that the term "or" is generally employed in its sense including "and/or" unless the content clearly dictates otherwise.

The headings and Abstract of the Disclosure provided herein are for convenience only and do not interpret the scope or meaning of the embodiments.

Figure 1:
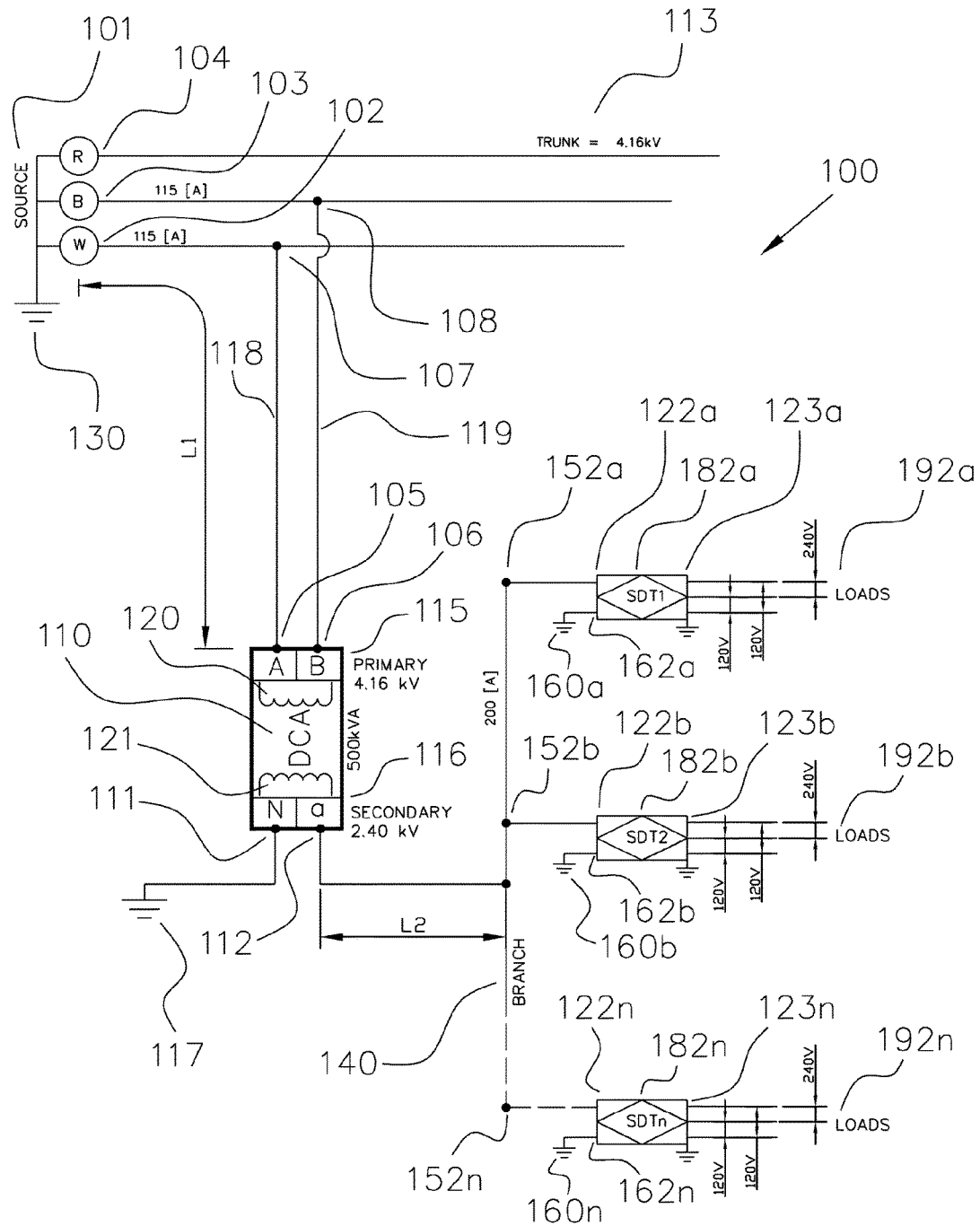
FIG. 1 is a schematic diagram of a single Distribution Circuit Adaptor "DCA" (a variation of an existing transformer) installed in series between a trunk and a branch of a three (3) phase network, according to at least one implementation.

FIG. 1 shows an electrical power distribution network 100 with an adaptive subsystem in the form of a distribution circuit adaptor 110 installed in series connecting the network's trunk 113 to the network's branch lines 140 (only one shown in FIG. 1). As illustrated, a primary side 115 of the DCA 110 taps only one (1) pair of the three (3) possible pairs of the medium voltage trunk 113, while a secondary side 116 of the DCA 110 relies on an earthen ground 117 to close its own load return circuit. This example helps illustrate how a 200 A single phase branch may be supplied while drawing only 115 A from a three (3) phase source, the return circuit to which is closed using only its supply conductors, advantageously eliminating the practice of returning through higher resistance media.

The DCA 110 has a first primary conductor 118 between a primary terminal 105 and a trunk tap 107. The DCA 110 has a second primary conductor 119, illustrated between a primary terminal 106 and a trunk tap 108. The circuit comprising source terminal 102, tap 107, terminal 105, a primary coil 120 of the DCA 110, terminal 106, tap 108, terminal 103, and source phase BW together constitute a closed loop circuit delivering energy to DCA 110 for distribution to branch circuits or lines connected to its secondary side. As shown, by way of example only, this primary loop operates at 4.16 kV and carries 115 amps.

Source 101 has 3 available terminals (102, 103, 104), the sinusoidal signals for which are 120 degrees out of phase with respect to each other. Source 101 also has an earthen ground 130 that is available as a return circuit but is not required for completing the transfer of energy between itself and DCA 110.

On the secondary side 116 of the DCA 110, a neutral terminal 111 and an output terminal 112 are shown, by way of example, delivering a secondary voltage of 2.40 kV (i.e., 4.16/1.73) which may be accomplished with any suitable transformer. In the illustrated example, neutral terminal 111 is connected to an earthen ground 117, while output terminal 112 is connected in parallel with each of branch taps 152a-152n (only three shown, collectively 152), supplying respectively step down transformers (SDT) 182-182n (only three shown, collectively 182) located at "n" different load sites to supply respective loads 192-192n (only three illustrated, collectively 192). The load sites are typically located in the same general area as one another, but can be an unspecified distance apart from one another. Each of the SDTs 182a, 182b and 182n is also connected to respective earthen ground 160a, 160b, and 160n (collectively 160).

Accordingly, the transfer of electrical energy between DCA 110 and an SDT 182a is accomplished through the closed loop circuit formed by: output terminal 112, branch tap 152, the primary coil of SDT 182, ground point 160, ground point 117, and the secondary coil 121 of DCA 110. A corresponding circuit is formed between each of the SDTs 182, all of which close their return path in parallel through earthen ground 160. In this example, each SDT 182 reduces the medium voltage of the branch circuit 152 to the low voltages 120/240 V typical at loading sites. When employing a single DCA 110, the primary side 115 of the DCA 110 taps only one (1) pair of the three (3) possible pairs of the medium voltage trunk 113. This permits an improved efficiency on the primary side 115, reducing the resistivity of the return path to the source 101, even though the secondary side 116 of the DCA 110 (as shown) relies on a legacy earthen ground 117 to close its own secondary return circuit. Nevertheless, this example helps illustrate how a 200 A single phase branch may be supplied while drawing only 115 A from a three (3) phase source, the return circuit to which is closed using only its supply conductors, eliminating the practice of returning through higher resistance media between earthen grounds 117 and 130.

In this simple example, the distance (L1) from DCA 110 to the source 101 is much greater than the (average) distance (L2) from DCA 110 to the branch 140 it feeds. FIG. 1 illustrates a single DCA 110 supplying a single branch 140, feeding "n" leaves each comprised of a Step Down Transformer (SDT) 182 having an unspecified number of low voltage loads 192. Notably, the earthen grounds 160a, 160b, 160n on each leaf circuit are shown applied on both the primary side 122 and secondary side 123, respectively, of the applicable step down transformer 182, which is common practice not only for safety purposes but also for grounded neutral supply panels. In general, the illustrated implementation may be preferred where trunk distances are relatively long, the installation site of the DCA 110 is relatively close to the geometric center of the group of SDTs 182 feeding the loads 192, and local soil conditions are sufficiently conductive that using the existing earthen ground is an acceptably efficient means by which to close the circuit at each leaf back to its own SDT 182. Note also that as the number of leaves on this branch circuit 140 grows, nothing in the described topology precludes the installer adding a dedicated grounding conductor when installing a new service panel to feed the additional loads 192.

As shown, by way of example only, DCA 110 could be installed to retrofit a conventional three (3) phase electrical power distribution network from source 101 supplying "n" of distant single phase loads 192a-192n each connected through branch 140. The example DCA 110 is connected to the trunk 113 of source 101 on its primary terminals 105 and 106, which tap into the trunk 113 at connection points 107 and 108. The distance from source terminal 102, through tap point 107, to primary terminal 105 of DCA 110 is substantially the same as the distance from source terminal 103 to primary terminal 106, and that trunk distance is denoted generally as L1. Branch circuit 140, being supplied through DCA 110, could be feeding a residential subdivision of "n" houses arranged around a cul-de-sac having a convenient common point at which to position DCA 110 in relatively close proximity to each of the SDTs 182a-182n supplying said loads 192a-192n. According to an optimal installation, the average distance between DCA 110 and the group of SDTs 182 should be minimized.

Returning to the specific example illustrated in FIG. 1, on the secondary side 116 of the DCA 110, return terminal 111 has been connected to the earthen ground 117, while supply terminal 112 is connected to branch 140 a distance L2 away. In the present example, the distance L1 is preferably at least twice the length of L2. Although the distance L1 is typically set by factors outside the control of the network operator, for retrofit purposes, the greatest savings available on a given installation tends to occur when the distance L2 is minimized. Ideally, determination of the location at which DCA 110 is installed will also take into account the distances between supply terminal 112 and connection points 152a-152n (three illustrated, collectively 152) each of branch 140, such that at the same time the distances between return terminal 111 and each of the primary return terminals 162a-162n (three illustrated, collectively 162) of the respective SDT 182 is also minimized. To the extent that the installation of the present loading example can be "balanced," a 500 KVA DCA requiring 115 Amps per phase from a 4.16 KV trunk could be used to adapt an existing 200 Amp branch 140 operating at 2.4 KV supplying a suitable number of SDTs 182 having 120/240 VAC secondary outputs.

The method of the present disclosure teaches the manner by which to identify the optimal location at which to insert any embodiment of DCA. The most basic version of the method of the present disclosure is to locate a point on the network trunk 113 at which to apply taps 107 and 108 with primary conductors 118 and 119 that have the effect of extending the trunk to DCA terminals 105 and 106, which medium voltage circuits combine to comprise distance L1. The point in question may be selected to position the proposed DCA 110 as close as practically possible to the branch 140 circuit that DCA 110 will supply, such that the distance L2 is also the minimum practically possible without needing to reconfigure or add local infrastructure, thereby keeping the cost of installing DCA 110 relatively lower. The practical objective is understood to be that the network operator can recover (from energy savings) the cost of installing each DCA 110 in the shortest possible time. The greater the energy consumption rate of branch 140 the more quickly DCA 110 can pay for itself. A person of skill in the art would understand that the factors influencing the rate of financial recovery also include the length and capacity of all of the conductors comprising branch 140 between points: 122a and 152a; 122b and 152b; 122n and 152n; and 152a and 152*n*. According to the implementation illustrated in FIG. 2, the network engineer calculating the parameters needed to select the location at which to install DCA 110 would also take into account the length and capacity of the return circuit 240 as well as all of the conductors 262*a* through 262*n*. The specific process and sequence for this determination may vary as between retrofit and new installations when DCA 110 is installed into an existing legacy network versus when a new subdivision is to be constructed and the new branch of the subject distribution circuit is yet to be designed, so remains better subject to electrically optimal design for essentially the same cost. Notwithstanding the differences in the process for locating DCA 110 as between retrofit and new construction, the underlying electrical parameters to be applied are the same.

According to the most basic version of the above-discussed process, the network design engineer selecting a physical location (to install the DCA 110) at which L1 is at least twice the distance of L2 will experience at least a portion of the theoretically available advantages of the method disclosed herein by maintaining the trunk voltage at the higher "medium/line" voltage level over the longer distance L1 between the substation (or other) source and the input or primary terminals 105 and 106 on DCA 110. Those advantages will be further enhanced the shorter the distance L2. Further savings will frequently be enjoyed when the earthen grounding conductor between nodes 111 and 117 is replaced by the dedicated return conductor between nodes 211 and 251, so as to connect the SDT return conductor 262*a* by a metallic (rather than earthen) path to the N terminal 211 on the DCA 110.

The foregoing process permits network operators to supply the same power using a greater portion of their existing circuits at a higher voltage level while drawing less current from the trunk lines, such that ohmic heating losses are reduced across the transmission circuit. At the same time, the system resulting from adapting existing network elements via the method disclosed herein will be more electrically symmetrical since the resistance of the supply and return paths will be more closely matched than when earthen ground or a neutral conductor is used as the return circuit on either (or both) side of the DCA 110. The combined effect of lower current flow and better balanced resistance throughout the closed loop AC supply circuit puts less stress on network components.

However, to determine the optimal location at which to install DCA 110 in the distribution circuit of a given network, the design engineer should take into account the actual conductor sizes (i.e., current carrying capacity), metallic composition (i.e., resistivity per unit length), length, loads, internal DCA iron losses and other local electrical characteristics so as to create an accurate equivalent circuit for use in comparing the influence of all circuit elements unique to the specific installation site. The ratio between L1 and L2 is a practical and quick rule of thumb for applying the adaptation method of the present disclosure.

Selecting one SDT 182*a* for comparison, disadvantageously in a traditional distribution network having no DCA installed, the energy flow from source terminal 102 would travel along the network trunk 113 at 4.16 KV, connecting to tap point 107 and thereon connecting directly to branch 140 at tap 152*a* being a primary terminal of SDT 182*a*. The primary return circuit of SDT 182*a*, having been connected to earthen ground 160*a*, must therefore extend all the way back to the earthen ground 130 at the three (3) phase source 101 (alternatively through a 4$^{th}$ neutral conductor (not shown)), which is the combined distance L1+L2.

Introducing DCA 110 into the secondary side of three (3) phase distribution circuit 100 results in at least two distinct improvements. First, grounding losses are reduced by more efficiently closing the return circuit between load point 160 and DCA ground 117, rather than via earthen ground 130 of three (3) phase source 101. Second, harmonics are reduced by better balancing the loading on three (3) phase source 101, while using the extended trunk line between primary terminal 106 of DCA 110 and trunk tap point 108 to close the return circuit of SDT 182 partly through source terminal 103 during a portion of its delivery cycle that is 120 degrees out of phase with source terminal 102. For greater clarity, with DCA 110 adapting the branch of the sample circuit to its trunk, the distance between load return circuit point 160 and adaptor ground 117 is reduced to L2. At the same time, the energy consumption at the secondary side of SDT 182 is shared across source terminals 102 and 103, helping balance the loading on three (3) phase source 101.

Figure 2:
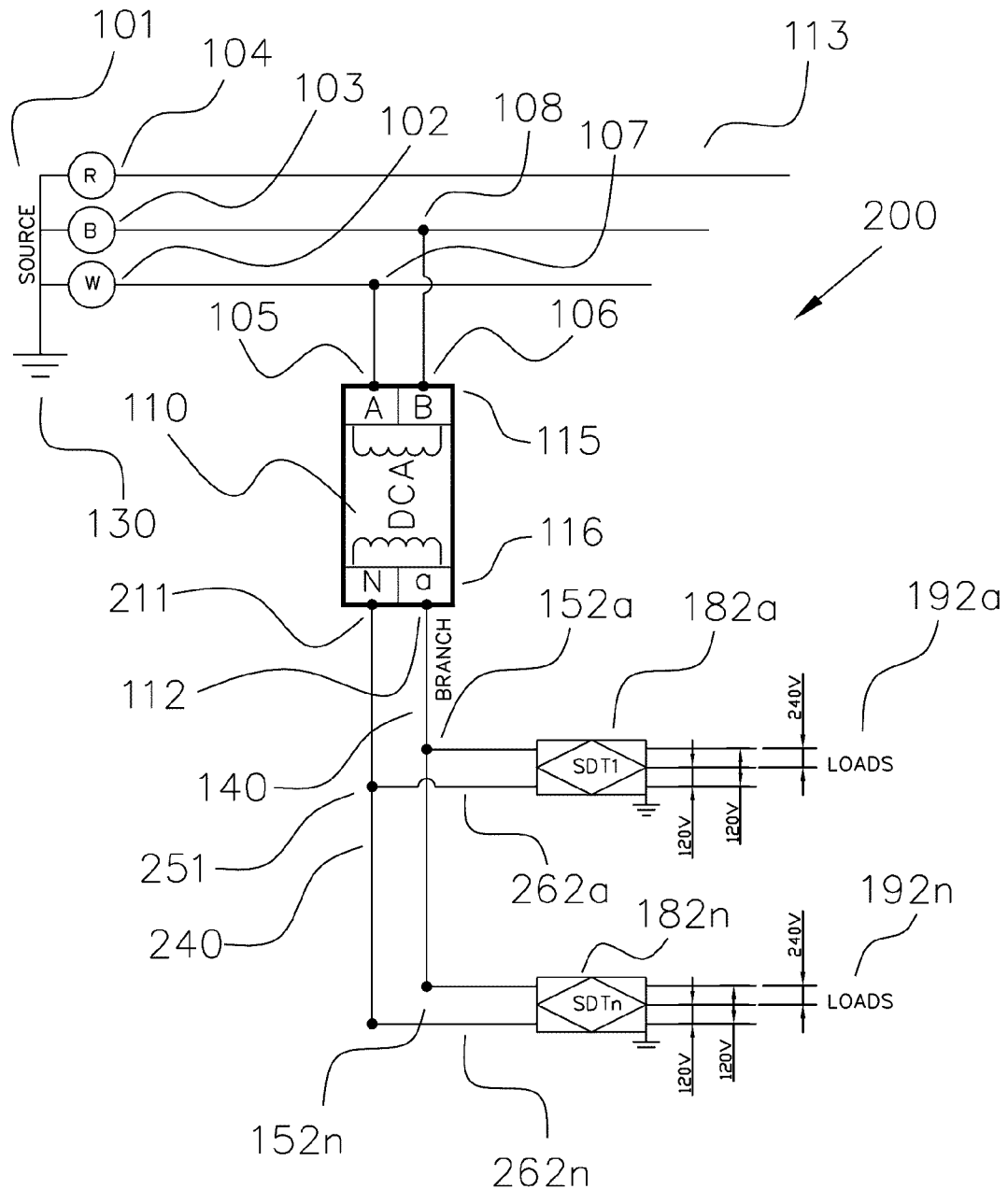
FIG. 2 is a schematic diagram of the single DCA of FIG. 1, illustrating a secondary of the DCA using a dedicated conduit to close the return path between the DCA and each SDT loading the DCA's medium voltage branch circuit, according to at least one implementation.

FIG. 2 shows an electrical power distribution network 200 with an adaptive subsystem in the form of a DCA 110 installed in series connecting the network's trunk 113 to its branch line 140. Some elements, arrangements or configurations are similar in some respects to those of the implementation of FIG. 1. Identical or similar elements to that of the implementation of FIG. 1 are identified by the same reference numbers as used in reference to FIG. 1. Only substantial differences are discussed below.

The secondary side 116 of the DCA 110 uses a dedicated conduit 240 to close the return path between itself and each SDT 182 loading its medium voltage branch circuit. As in FIG. 1 the low voltage circuits on the secondary side 123*b* of the SDT 182 may still employ an earthen ground. Again, a single DCA 110 draws from a three (3) phase source 101 at trunk tap points 107 and 108. The same loop applies on the primary side 115 of DCA 110. The circuit comprising source terminal 102, tap 107, terminal 105, the primary coil 120 (FIG. 1) of DCA 110, terminal 106, tap 108, terminal 103, and source phase BW together constitute a closed loop circuit, delivering energy to DCA 110 for distribution to "n" leaf circuits connected to its secondary side. In contrast to the implementation of FIG. 1, DCA 110 requires no earthen ground closing a circuit back to the ground 130 of the three (3) phase source 101 (e.g., substation). Instead, DCA 110 operates with a floating neutral connecting terminal 211 to dedicated return "ground" conduit 240. Branch circuit 140 remains connected to output terminal 112 and is connected via branch tap points 152*a*-152*n* to one side of the primary coil of each of SDTs 182*a*-182*n*. Dedicated return "grounding" conduits 262*a*-262*n* (only two shown, collectively 262) are also applied to tap branch return conduit 240. The operational voltage level on the branch 140 will according to the current example, be the trunk voltage/1.73 as DCA 110 adapts its branch to the available trunk.

Accordingly, the transfer of electrical energy between DCA 110 and SDT 182 is accomplished through the closed loop circuit formed by: output terminal 112, branch tap 152, the primary coil of SDT 182, branch tap 251, floating neutral terminal 211, and the secondary coil 121 (FIG. 1) of DCA 110, without relying on any earthen ground return circuit to deliver power to its loads 192.

The approach shown in FIG. 2, by which the often unknown, unreliable, and seasonally variable resistivity of the local soil formation provides an earthen return path to close the circuits on both the primary coil 120 (FIG. 1) and the secondary coil 121 of the DCA 110 between the trunk 113 and branch circuits 140, may be applied to more closely balance the resistance of that circuit at a lower level. Such results in lower line losses and a smoother flow of energy across the trunk and branch circuits of the network. The related reduction in both wasted energy and harmonics on both sides of DCA 110 has the same series of benefits already described above as resulting from approach illustrated in FIG. 1, eliminating earthen grounding effects from the trunk alone.

This floating ground implementation uses any suitable pair of out of phase source conductors to close the primary return circuit between the DCA 110 and its source 101, as well as using dedicated grounding conduit 240 to close the return circuit between the secondary side 116 of the DCA 110 and each SDT 182 that it feeds. It should be noted that the disclosed approach is directed to the power delivery function of the DCA 110 and the subsystem of which it is one element, but in no way precludes or diminishes the use of earthen grounds to address the safety function of such circuits, for example to manage stray or over current scenarios, ground fault interruption, or lightning arrestors. Accordingly, the representation of fuses, arrestors, safety code grounding and other common circuits has been intentionally omitted to prevent obscuring the illustrations.

Figure 3:
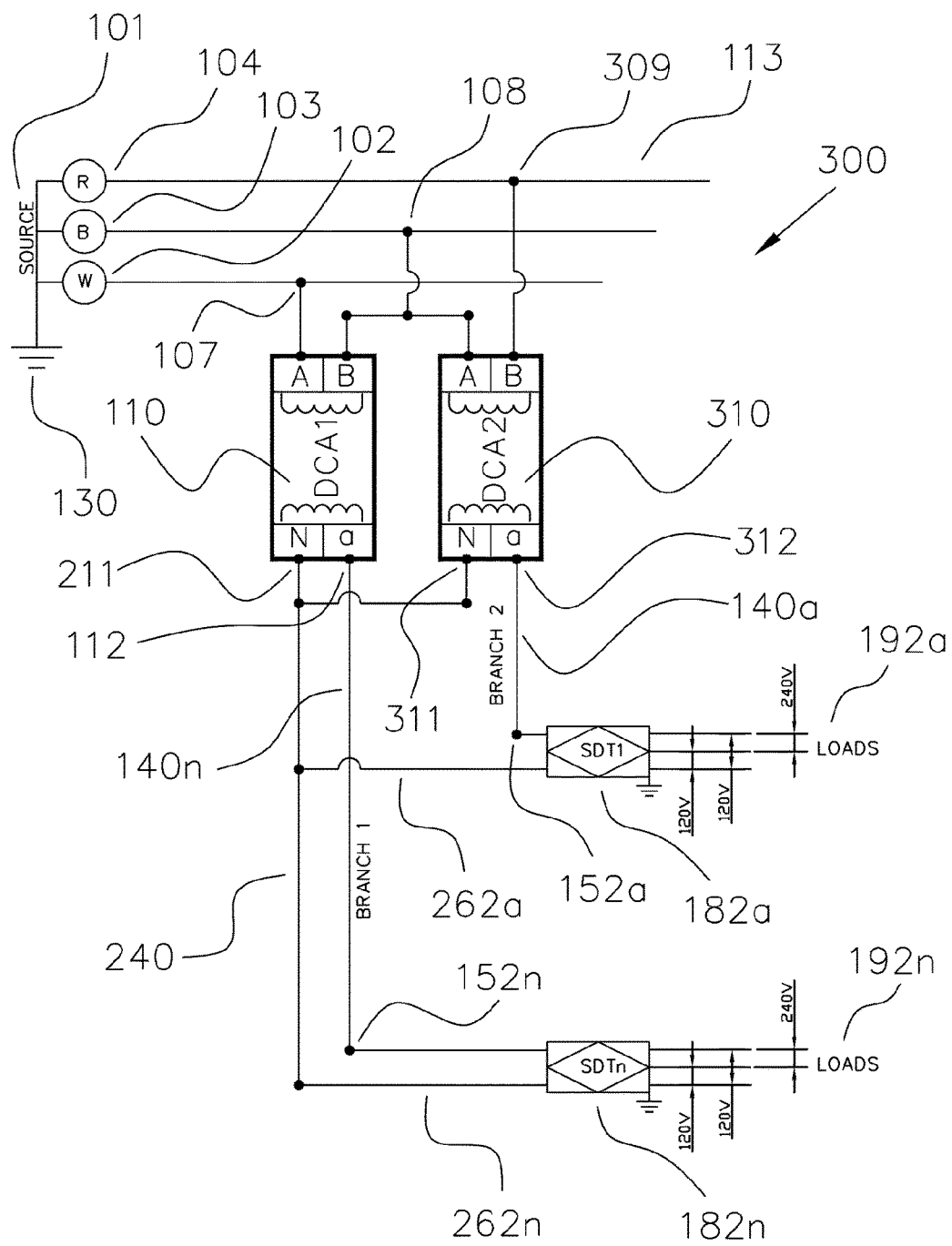
FIG. 3 is a schematic diagram of a dual DCA, according to at least one implementation, in which a primary of each of the DCAs taps a common source conductor but draws energy across different respective (e.g., out of phase) source pairs.
Figure 4:
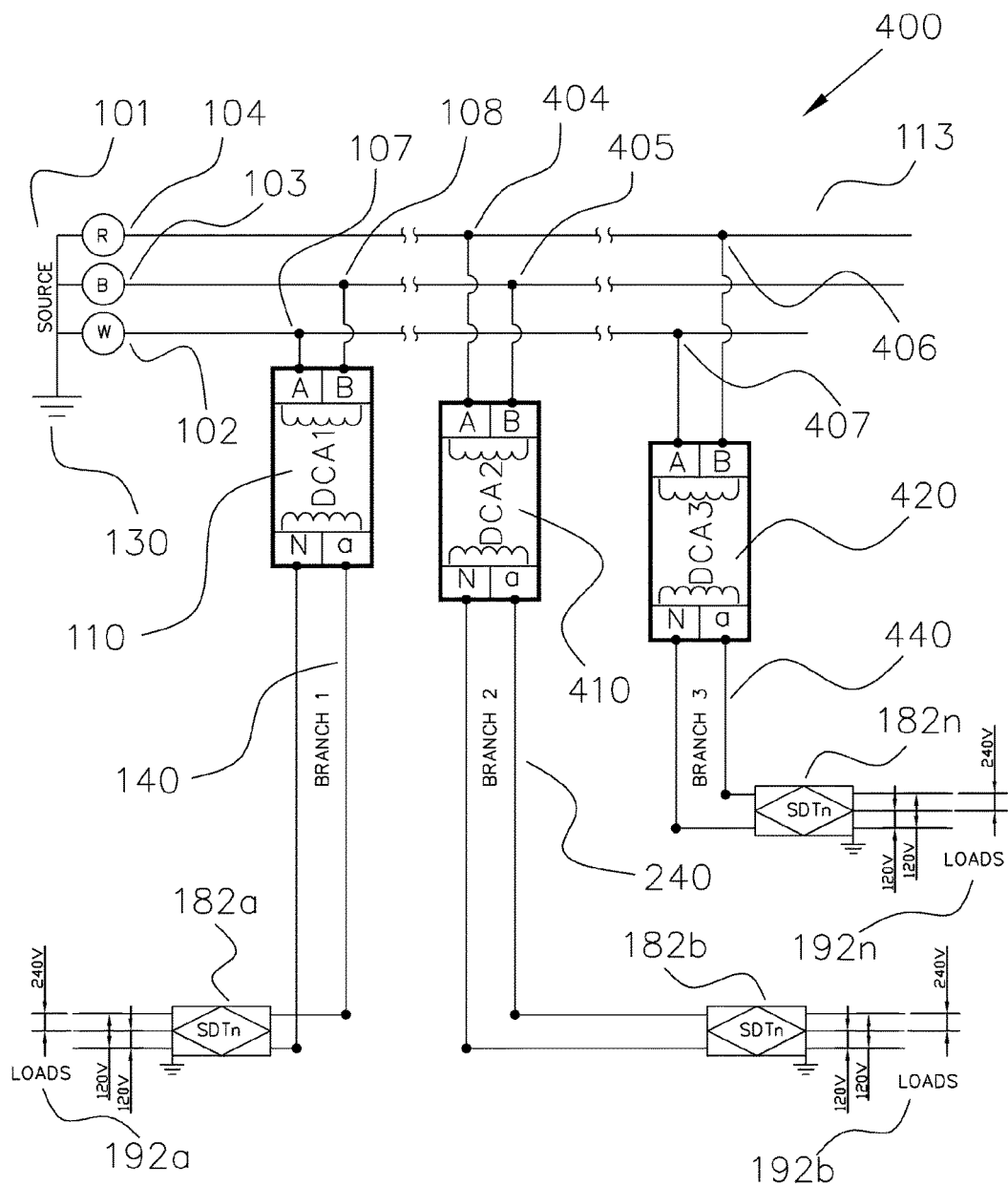
FIG. 4 is a schematic diagram of a triple DCA, according to at least one implementation, in which a primary of each DCA taps a different respective phase pair of the source, facilitating symmetrically balancing loading and reducing harmonics.

Similarly, FIGS. 3 and 4 both apply the adaptive subsystem to close the trunk and branch return circuits without reliance on any earthen grounding. Any of a number (e.g., 1, 2, or 3) of adaptor subsystems may be operated advantageously over traditional networks, to more efficiently deliver electrical power with either or both of their trunk or branch circuits eliminating earthen ground returns.

FIG. 3 shows an electrical power distribution network 300 with an adaptive subsystem in the form of dual DCAs 110 and 310 installed in series connecting the network's trunk 113 to its branch lines 140a-140n. Some elements, arrangements or configurations are similar in some respects to those of the implementation of FIG. 1. Identical or similar elements to that of the implementation of FIG. 1 are identified by the same reference numbers as used in reference to FIG. 1. Only substantial differences are discussed below.

In this implementation, the dual DCAs 110 and 310 are stacked in parallel to enhance total power delivery capacity as "n" increases over the life of the distribution network and more loads draw more total power from the trunk lines 113. Respective primary coils 120 (FIG. 1) of the DCAs 110 and 310 tap a common source conductor B via tap 108, but draw energy across different source pairs W and R, respectively, which are out of phase with one another. Similarly, the secondary coils 121 (FIG. 1) of the DCAs 110 and 310 share a common dedicated neutral terminal 211 and 311, respectively, but supply energy to two different branch circuits 140a, 140n. As in FIG. 2, the implementation of FIG. 3 eliminates earthen grounding from both the primary and secondary return circuits of the DCAs 110 and 310.

FIG. 4 shows an electrical power distribution network 400 with an adaptive subsystem in the form of DCA 110, 410 and 420 installed in series connecting the network's trunk 113 to its branch lines 140, 240, and 440, respectively. Some elements, arrangements or configurations are similar in some respects to those of the implementation of FIG. 1. Identical or similar elements to that of the implementation of FIG. 1 are identified by the same reference numbers as used in reference to FIG. 1. Only substantial differences are discussed below.

In this implementation three DCAs 110, 410, and 420 tap different out of phase pairs of trunk conductors at potentially distant locations across the network. Specifically DCA 110 taps source pairs B and W, DCA 410 taps source pairs R and B, and DCA 420 taps source pairs R and W. As illustrated, the partially (electrically) isolated DCAs 110, 410, 420 also supply isolated branch circuits 140, 240, and 440, respectively. As in FIGS. 2 and 3, earthen grounding is eliminated from both the primary and secondary return circuits of all DCAs. As in FIG. 3, each DCA 110, 410, and 420 supplies energy to a separate branch circuit 140, 240, and 440, respectively. Unlike FIG. 3, the DCAs 110, 410 and 420 do not share a common dedicated neutral terminal.

According to all of the foregoing, network distribution networks can deliver, and charge load site consumers for a greater portion of the total energy generated by and transmitted across existing infrastructure. Inserting one or more distribution circuit adaptors as a novel subsystem of conventional distribution network reduces losses and extends the life cycle of existing lower capacity branch conductors, while the resulting more symmetrical loading of the trunk lines also tends to extend the life cycle of the source generators. The concurrent reduction of spikes and surges may also permit operators to collect a premium for delivering "cleaner" power.

U.S. Provisional Patent Application No. 62/274,948, filed Jan. 5, 2016, to which the present application claims priority, is hereby incorporated herein by reference in its entirety. The above description of illustrated embodiments, including what is described in the Abstract, is not intended to be exhaustive or to limit the embodiments to the precise forms disclosed. Although specific embodiments of and examples are described herein for illustrative purposes, various equivalent modifications can be made without departing from the spirit and scope of the disclosure, as will be recognized by those skilled in the relevant art. The teachings provided herein of the various embodiments can be applied to other systems to generate customized orderable articles, not necessarily the exemplary server computing system generally described above.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

We claim:

1. A method to reduce energy losses during electrical power distribution across a three phase network which comprises a plurality of source terminals electrically coupled to a corresponding plurality of trunk lines, a number of branch lines, and for each of the branch lines, a step down transformer coupled to at least one single phase load that draws electrical power via the respective branch line, the method comprising:

for at least one pair of the plurality of trunk lines, providing a respective distribution circuit adapter (DCA), the DCA comprising a primary coil comprising a first input terminal and a second input terminal and a secondary coil comprising a first output terminal and a second output terminal;

for each provided DCA, positioning the DCA at a physical location which is relatively closer to at least one of the number of branch lines than to the plurality of source terminals;

for each pair of the at least one pair of trunk lines for which a respective DCA is provided, electrically coupling a first one of trunk lines to the first input terminal and a second one of the trunk lines to the second input terminal of the respective DCA; and for each provided DCA, electrically coupling at least one branch line to the first output terminal of the DCA.

2. The method of claim 1, further comprising:
for each provided DCA, coupling an electrical conduit between the second output terminal of the DCA and a return path of an input of at least one step down transformer of at least one branch line coupled to the output of the DCA.

3. The method of claim 1 wherein providing a respective DCA for at least one pair of the plurality of trunk lines comprises providing a respective DCA for at least two pairs of the plurality of trunk lines.

4. The method of claim 1 wherein providing a respective DCA for at least one pair of the plurality of trunk lines comprises providing a respective DCA for at least a first pair of trunk lines and a second pair of trunk lines, the first pair of trunk lines sharing a common trunk line with the second pair of trunk lines.

5. The method of claim 4, further comprising:
for each provided DCA, coupling an electrical conduit between the second output terminal of the DCA and a return path of an input of at least one step down transformer of at least one branch line coupled to the output of the DCA.

6. The method of claim 1 wherein providing a respective DCA for at least one pair of the plurality of trunk lines comprises providing a respective DCA for at least three pairs of trunk lines, each pair of trunk lines sharing a common trunk line with at least one other pair of trunk lines.

7. The method of claim 6, further comprising:
for each provided DCA, coupling an electrical conduit between the second output terminal of the DCA and a return path of an input of at least one step down transformer of at least one branch line coupled to the output of the DCA.

8. The method of claim 1 wherein positioning the DCA at a physical location which is relatively closer to at least one of the number of branch lines than to the plurality of source terminals comprises positioning the DCA at a physical location which is a first distance from the plurality of source terminals and a second distance from the at least one of the number of branch lines, the first distance at least twice the second distance.

9. A method to reduce energy losses during electrical power distribution across a three (3) phase network which comprises a plurality of source terminals electrically coupled to a corresponding plurality of trunk lines, a number of branch lines, and for each of the branch lines, a step down transformer coupled to at least one single phase load that draws electrical power via the respective branch line, the method comprising:
for at least one pair of the plurality of trunk lines, providing a respective transformer distinct from the step down transformer for each of the branch lines;
for each provided transformer, positioning the transformer at a physical location which is relatively closer to at least one of the number of branch lines than to the plurality of source terminals;
for each pair of the at least one pair of trunk lines for which a respective transformer is provided, electrically coupling the pair of trunk lines to a primary side of the respective transformer; and
for each provided transformer, electrically coupling at least one branch line to an output of the transformer.

10. The method of claim 9, further comprising:
for each provided transformer, coupling an electrical conduit between a return path of the output of the transformer and a return path of an input of at least one step down transformer of at least one branch line coupled to the output of the transformer.

11. The method of claim 9 wherein providing a respective transformer for at least one pair of the plurality of trunk lines comprises providing a respective transformer for at least two pairs of the plurality of trunk lines.

12. The method of claim 9 wherein providing a respective transformer for at least one pair of the plurality of trunk lines comprises providing a respective transformer for at least a first pair of trunk lines and a second pair of trunk lines, the first pair of trunk lines sharing a common trunk line with the second pair of trunk lines.

13. The method of claim 12, further comprising:
for each provided transformer, coupling an electrical conduit between a return path of the output of the transformer and a return path of an input of at least one step down transformer of at least one branch line coupled to the output of the transformer.

14. The method of claim 9 wherein providing a respective transformer for at least one pair of the plurality of trunk lines comprises providing a respective transformer for at least three pairs of trunk lines, each pair of trunk lines sharing a common trunk line with at least one other pair of trunk lines.

15. The method of claim 14, further comprising:
for each provided transformer, coupling an electrical conduit between a return path of the output of the transformer and a return path of an input of at least one step down transformer of at least one branch line coupled to the output of the transformer.

16. The method of claim 9 wherein positioning the transformer at a physical location which is relatively closer to at least one of the number of branch lines than to the plurality of source terminals comprises positioning the transformer at a physical location which is a first distance from the plurality of source terminals and a second distance from the at least one of the number of branch lines, the first distance at least twice the second distance.

17. A method for delivering three phase electrical power from a source through a distribution network comprising a number of trunk lines electrically coupled to the source, a number of branch lines and at least one single phase load, the method comprising:
tapping at least one pair of medium voltage trunk lines;
electrically coupling a first end of a primary coil of a distribution circuit adaptor (DCA) to one of the pair of tapped medium voltage trunk lines;
electrically coupling a second end of the primary coil of the distribution circuit adaptor (DCA) to the other of the pair of tapped medium voltage trunk lines;
electrically coupling a secondary coil of the DCA to at least one medium voltage branch line;
providing a reduced resistivity return path between the secondary coil of the DCA and at least one load connected to the at least one medium voltage branch line; and
operating the distribution network using the tapped pair of medium voltage trunk lines to close the return path between the primary coil of the DCA and the source feeding the trunk lines.

18. The method of claim 17, further comprising:
electrically coupling the secondary coil of the DCA to at least one return path of a step down transformer associated with at least one of the number of branch lines.

* * * * *